June 30, 1970  T. J. SCARNATO ET AL  3,517,492

IMPLEMENT CONTROL ASSEMBLY

Original Filed Dec. 2, 1964  6 Sheets-Sheet 1

Inventors
James Morkoski
Thomas J. Scarnato
Paul C. Gordon

John J. Kowalik
Atty.

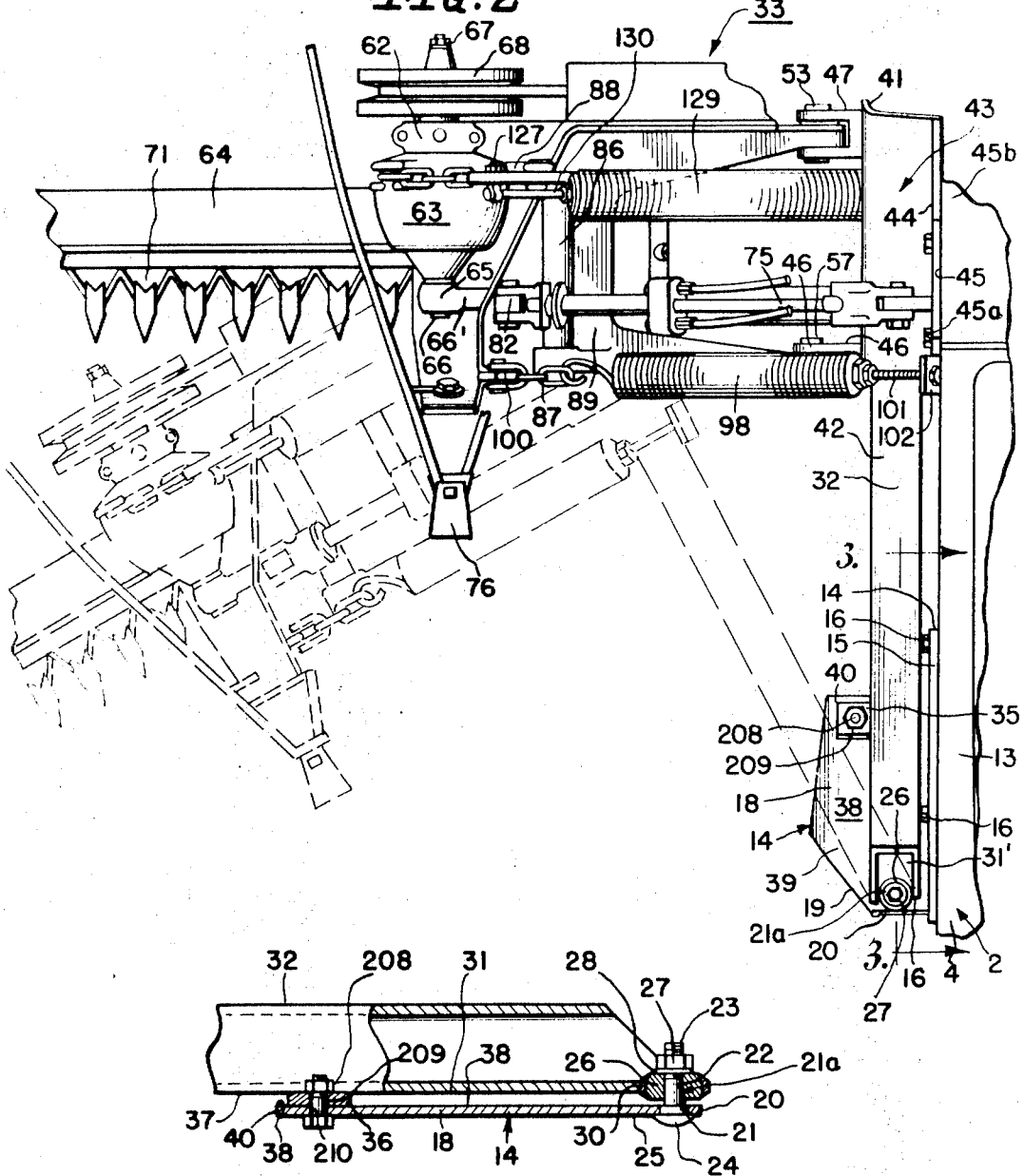

June 30, 1970  T. J. SCARNATO ET AL  3,517,492
IMPLEMENT CONTROL ASSEMBLY

Original Filed Dec. 2, 1964  6 Sheets-Sheet 3

Inventors
James Morkoski
Thomas J. Scarnato
Paul C. Gordon
John J. Kowalik
Atty.

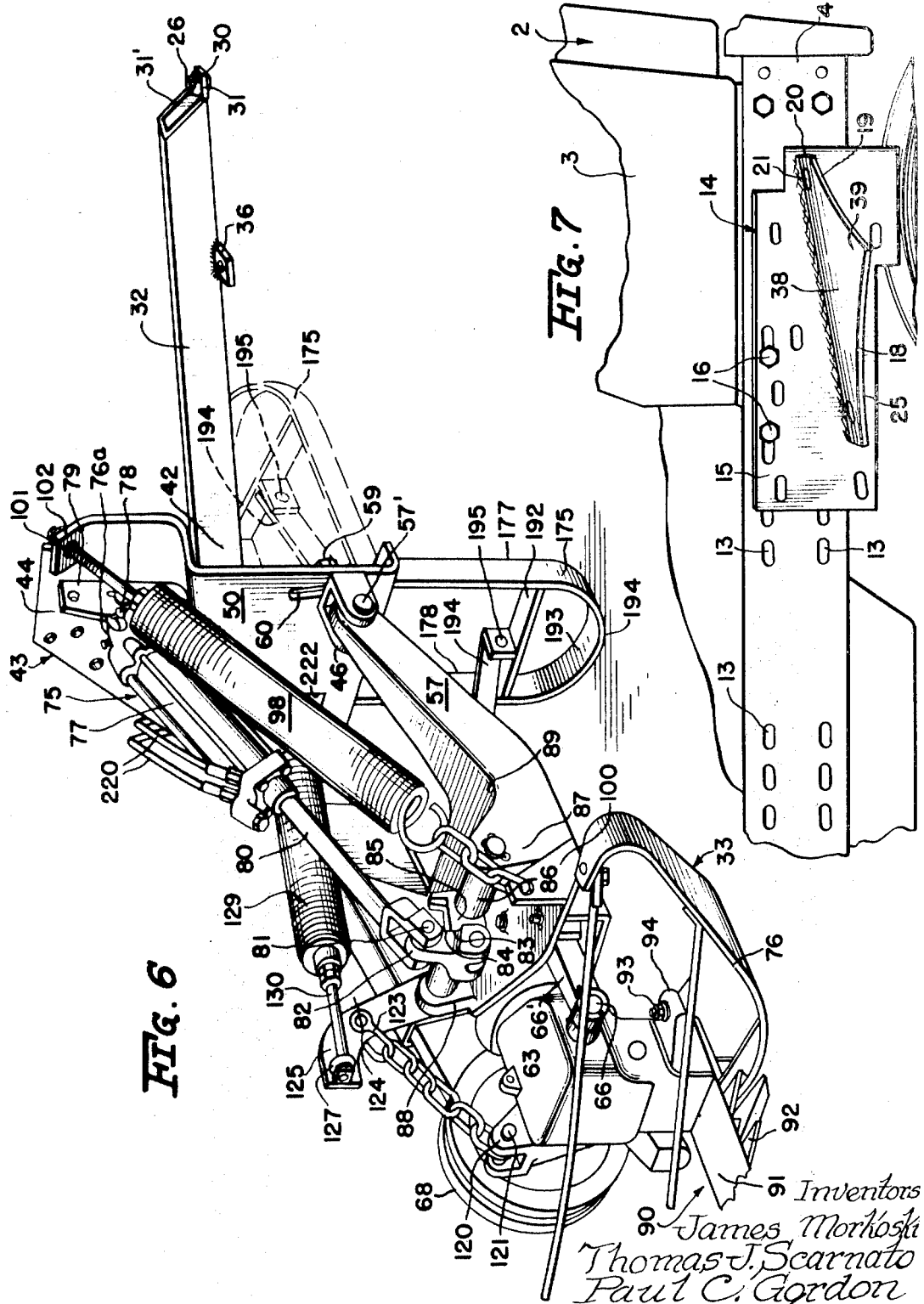

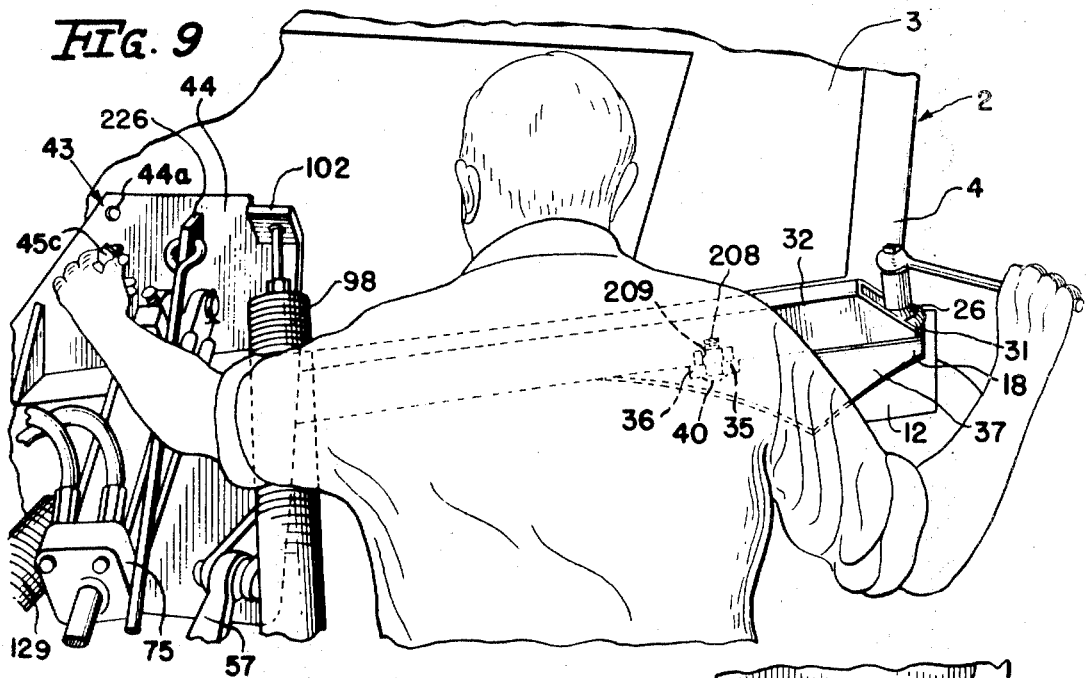
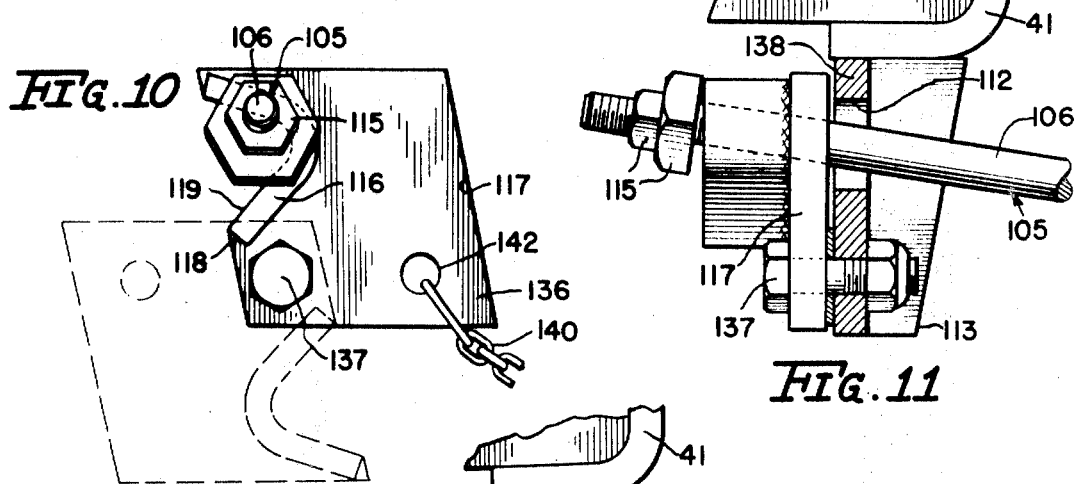
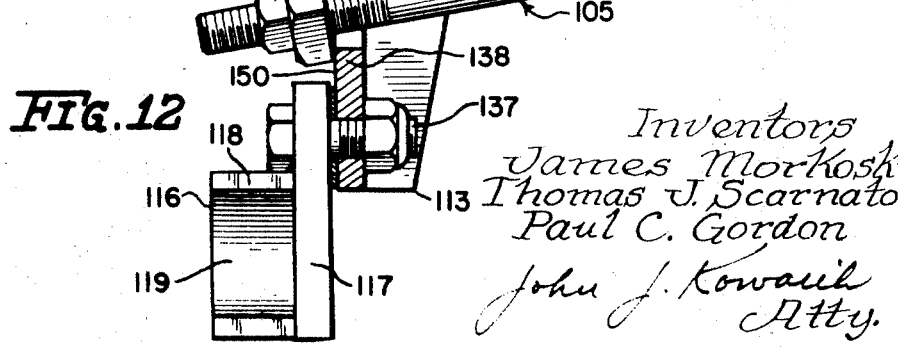

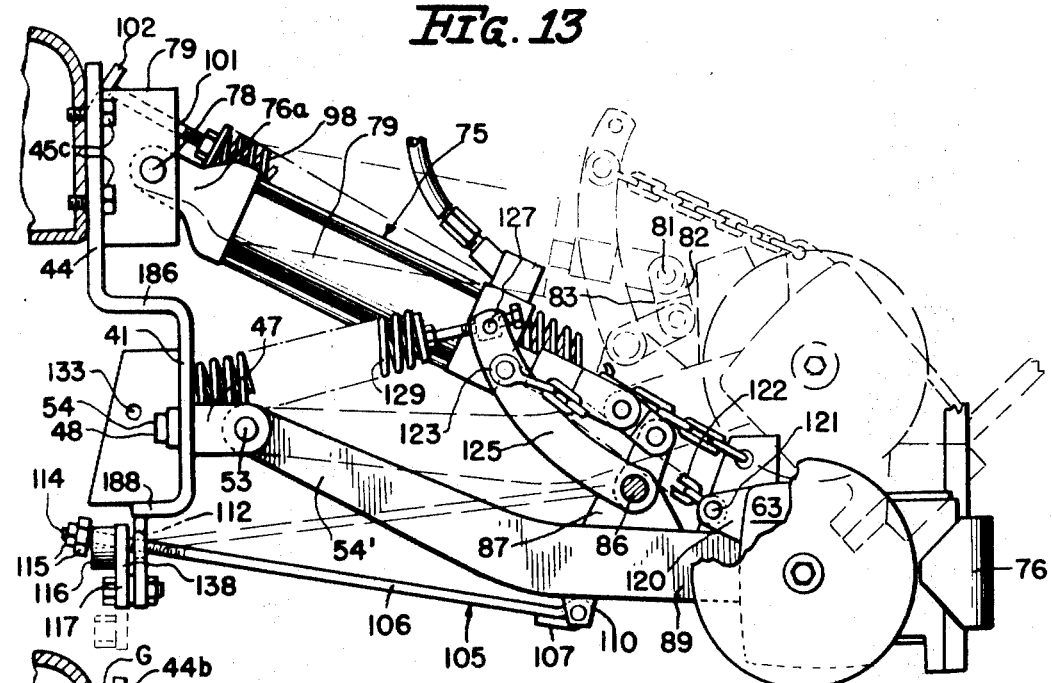
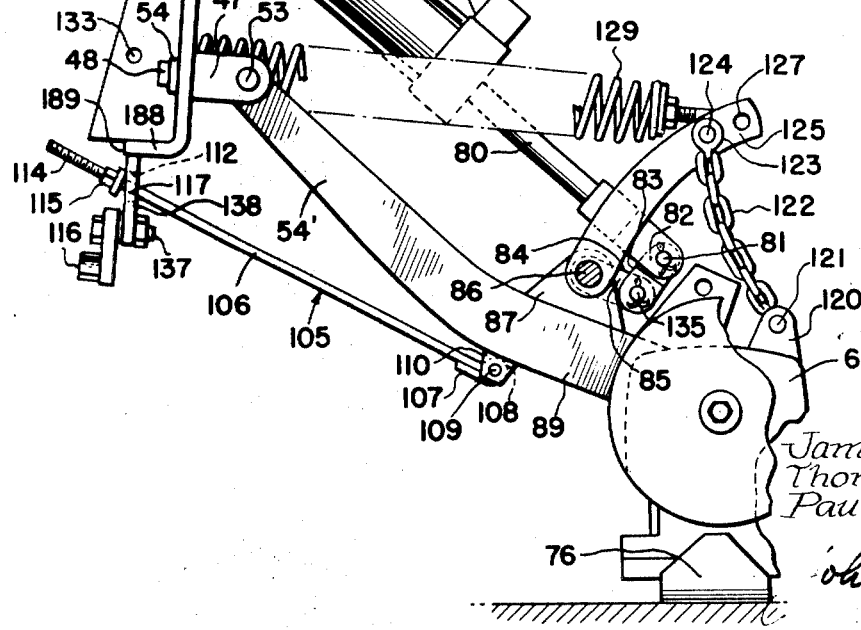

United States Patent Office 3,517,492
Patented June 30, 1970

3,517,492
IMPLEMENT CONTROL ASSEMBLY
Thomas J. Scarnato, Barrington, Paul C. Gordon, Hinsdale, and James Morkoski, Clarendon Hills, Ill., assignors to International Harvester Company, a corporation of Delaware
Original application Dec. 2, 1964, Ser. No. 415,382, now Patent No. 3,471,167, dated Oct. 7, 1969. Divided and this application Feb. 14, 1968, Ser. No. 705,526
Int. Cl. A01d 35/02
U.S. Cl. 56—25                                          11 Claims

ABSTRACT OF THE DISCLOSURE

A mechanism for controlling the lifting of a mower mounting linkage which has an arm pivoted at one end to the tractor and at its other end to the mower, a rod beneath the arm pivoted at one end to the arm and at its other end extending through an opening in a stop plate depending from the tractor, the rod having a bolt threaded thereon for adjusting the effective length of the rod whereby to control the rise of the arm prior to the mower being tilted upwardly by associated linkage about its pivot to the arm. A quick adjusting means is provided which may be swung between the plate and nut on the rod to foreshorten the rod and thus further control the action of the arm and mower.

---

This application is a division of our U.S. application Ser. No. 415,382 filed Dec. 2, 1964 for Self-Mounting Mower and Controls Therefor, now U.S. Pat. 3,471,167.

This invention relates to mowers and more specifically to a novel mounting therefor of the type wherein the mower is adapted to extend from a side of a tractor.

Heretofore mower mountings from a side of a tractor have been particularly cumbersome and required that the mower be manually pulled to the tractor or by a crane to a position whereat an attachment could be effected. The dismounting of the mower from the tractor, when the tractor is to be used for other purposes is also a problem and requires in most instances the use of other equipment since the mower parts are usually too heavy for the operator to move manually.

A general object of the invention is to provide a novel mower mounting comprising a frame with strategically located mounting portions for connection to the tractor and means being provided on the tractor which in conjunction with said portions of the frame assist in disposing the mower in mounted position to the tractor in response to the tractor being driven forwardly.

A more specific object of the invention is to provide a novel mower mounting comprising a mower frame having an extension member with a forward end which is adapted to be universally connected to a support on one side of the tractor adjacent the forward end thereof, the extension member swinging onto the support and positioning the frame against the side of the tractor as the tractor is drawn forwardly, the extension member also fulcruming on the support as the connection is tightened or loosened so as to align the attaching means on the frame with those on the tractor.

A further object of the invention is to provide a novel mounting structure for the mower which incorporates a caming action to lift the mower off the ground as the mower swings against the tractor.

A further object of the invention is to provide a novel mower wherein the attachment alignment mechanism also serves to control lifting movements of the mower for gagging the mower bar or folding it into transport position and to adjust the pitch of the mower bar.

These and other objects and advantages inherent in and encompassed by the invention will become more readily apparent from the specification and the drawings wherein:

FIG. 2 is a top plan view of the structure shown in FIG. 1 with the mower mounted on the tractor, the unmounted position being shown in phantom lines;

FIG. 3 is an enlarged sectional view taken substantially on the line 3—3 of FIG. 2;

FIG. 6 is a perspective view of the dismounted mower taken from the front and side thereof;

FIG. 7 is a fragmentary side elevational view of the cam structure;

FIG. 9 is a fragmentary side elevational view of the tractor and mower mounted thereon, illustrating the adjustment of the mower to position the same for attachment to the tractor;

FIG. 10 is a side elevation of the cam plate shown in its upper position in solid lines, and in its released position in dotted lines;

FIG. 11 is a rear edge view of the structure of FIG. 10;

FIG. 12 is a rear edge view of the structure of FIG. 10 with the cam in its released or lowered position;

FIG. 13 is a rear view of the mower in association with the tractor showing in solid lines the mower in transport position and in dotted lines in gag position; and FIG. 14 is a rear view of the mower on the tractor showing the mower in its lowered position and illustrating the operation to laterally align the mower frame to the tractor mounting pad.

Figure 1:
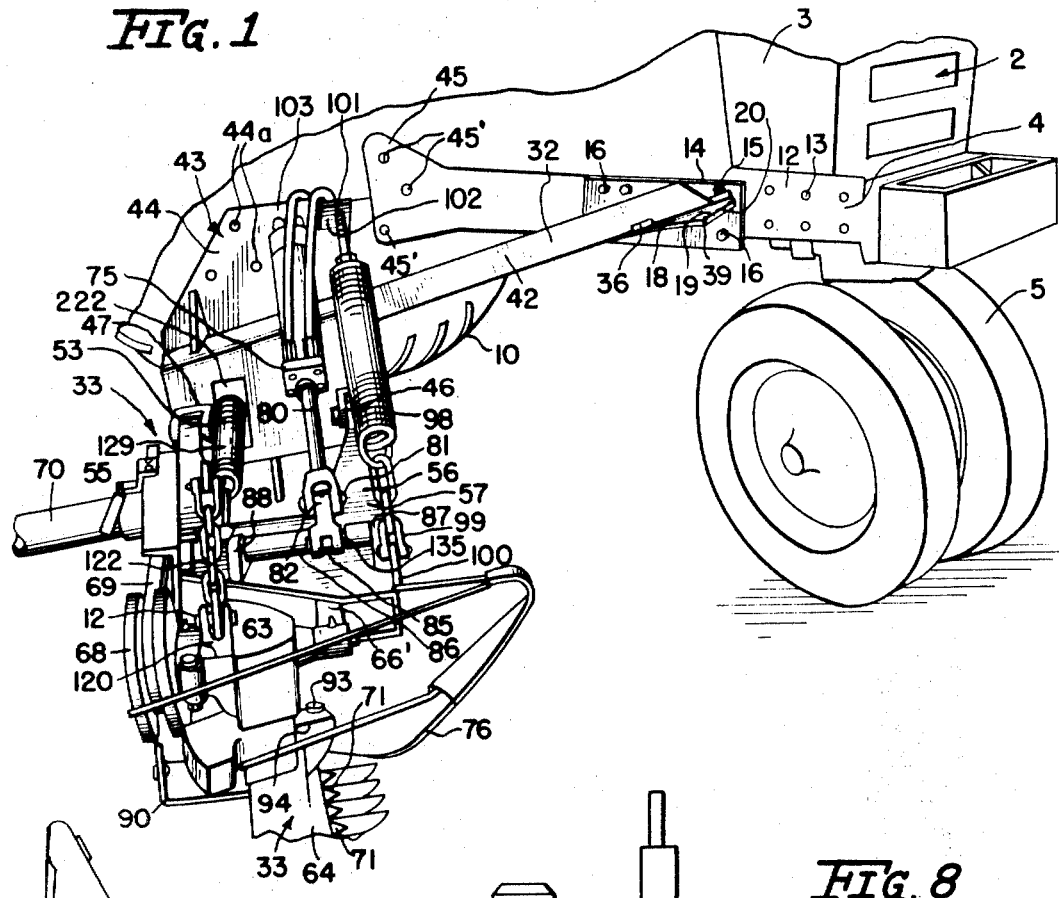
FIG. 1 is a perspective view of the mower and tractor, fragmentarily shown, preparatory to mounting of the mower.

Describing the invention in detail and having particular reference to the drawings, there is shown a tractor generally designated 2 having a longitudinal body 3 supported at its front end 4 on a front steering truck or wheel assembly 5 and at its rear is connected to a rear axle structure 8 which incorporates the rear drive assembly including the axle 9 and the spaced wheels 10. Normally the area between the front and rear wheel structure is termed the waist of the tractor and this is in part defined by a side sill member 12 at each side which runs longitudinally of the tractor and substantially horizontally and is provided with a plurality of mounting holes and openings 13. In the present instance the rightward sill 13 mounts adjacent to the forward end of the tractor a support bracket or lift mechanism 14 which comprises a substantially vertical, generally flat, mounting plate 15 secured to the side sill 12 as by bolts 16, 16. The mounting plate 15 is connected to an outwardly extending cam plate or ledge 18 which projects substantially horizontally and has a leading edge 19 which is angled rearwardly outwardly from its forward end 20 which is adjacent to the front of the tractor. The forward end of the plate 18 is provided with a vertical opening 21 for mounting a universal connection generally indicated 21a and comprising a shank 22 of a bolt 23 admitted through opening 21. The bolt 23 has a head 24 at its lower end underposed with respect to and engaging the underside 25 of the plate 18. Bolt shank 22 extends through a ball 26 and the upper end of the bolt shank 22 is threaded and mounts a nut 27 which engages the upper edge 28 of the ball 26. The ball 26 is encased within a socket 30 which is integrated with a bottom wall 31 at the front end 31' of a combination extension and mounting bar or frame member 32 of the frame 34 of a mower generally designated 33.

In the assembled position of the mower with the tractor, the bar 32, which is preferably of box section, extends alongside the sill 13 and intermediate its ends is provided with a fulcrum lug 36 which depends from the underside of the web 31 of the bar 32. The fulcrum lug 36 is a flat piece of bar stock which is suitably connected as by welding to the underside of the web 31 and in the mounted position of the mower rests on the top side 38 of the cam plate 18 adjacent to the rear end portion 40 thereof. It will be readily apparent from a consideration of FIGS. 1 and 7 that the outboard edge portion 39 of the cam plate 18 is sloped or curved downwardly outwardly to provide a ramp or cam means for assisting the arm 32 to ride up onto the plate 18 and to swing off the plate 18 as best seen in FIGS. 1 and 2. The rear end portion 42 of the arm 32 is connected to a mower mounting bracket portion 43 of the mower frame 34. Bracket 43 includes a substantially flat vertical portion 44 which is adapted to be seated against the adjacent vertical side portion of the waist or rear attachment means 45 (specifically the clutch housing) of the tractor and bolted thereto as by bolts 45a. The mounting structure 43 includes a lower channel-shaped portion 41 for supporting front and rear ear structures 46 and 47.

The ear structure 47 has a trunnion 48 which is journalled about on a substantially horizontal axis. Trunnion 48 is connected to the bight portion 51 of the ear 47, bight portion 51 abutting a front side 52 of web 50 and the back side 52 of the web 50 is engaged by nut 54 threaded on trunnion 48. Thus, the ear structure 47 which includes a pair of ears 47a, 47b is pivotal about a substantially horizontal axis transverse to the axis of the tractor. The apertured ears 47a, 47b receive a pivot pin 53 which is pivoted through the inner end 54' of the rear leg 55 of the mounting yoke or arm 56 of the mower framework.

The U-shaped yoke 56 has a front leg 57 which at its inner end is pivoted on a pin 57' to the ears 46a, 46b of the front ear structure 46 which is connected at its bight portion 46c to a generally horizontal bolt shank 59 which extends through a vertically elongated slot 60 which is concentric with the axis of the pivot of the pin or trunnion 48 of the rear ear structure 47. Thus, the U-shaped coupling arm or framework 56 is adjustable about an axis transverse to the tractor and this affects the attitude of the mower and the elevation of the front end portion of the extension 32 as will be hereinafter described. Bolt 59 is locked in position by nut 61.

The outer end of the arm 56 has a collar 62 pivotally mounting the housing 63 of the mower drive mechanism, said housing 63 being connected to the inner end of the mower bar 64. The collar 62 is coaxial with a stub shaft 66 on the housing which pivots on an arm 66' of a break-back release mechanism 66a mounted in arm structure 56, mechanism 66a pivoting about pin 66b with the mower for break-back release as well known to those skilled in the art. The collar 65 and shaft 66 are coaxial with the drive input shaft 67 whereby power may be delivered to the input flywheel 68 by means of the belt 69. Thus the outer end of the arm 56 is pivoted to the mower bar 64 via the housing 63 on a substantially horizontal fore-and-aft extending axis.

As stated, power is delivered to the flywheel 68 through the belt 69 from an input shaft and pulley assembly 70 which is suitably rotatably carried from arm 56. Shaft 70 extends rearwardly beneath the tractor and behind the rear axle is connected by a suitable power train to the power takeoff shaft at the rear of the tractor in a manner such as shown in U.S. Pat. No. 2,311,095. The transmission within the housing 63 and the connection thereof to the sickle 71 on the mower bar 64 is essentially such as shown in U.S. Pat. No. 2,824,416.

A hydraulic cylinder or actuator 75 is positioned between the shoe structure 76 of the mower and plate 44. The ram 75 has the upper end 76a of its cylinder 77 connected on a substantially horizontal axis as by a pin 78 to a lug 79 which is provided on the outer side of the mounting pad 44, said ram extending diagonally outwardly and downwardly and having its piston stem 80 pivotally connected on a substantially horizontal fore-and-aft extending axis by pin 81 to the upper end of a swing link 82. The link 82 provides a stop 83 which is abuttable with the back edge 84 of a lever 85 which is connected for rotation with a pivot or rockshaft 86, the rockshaft 86 extending through a pair of upstanding ears 87 and 88 which are formed integral on coupling arm structure 56 and its end portion 89 adjacent to the mower bar 64. The mower 90 includes the mower bar 91 and a sickle 92 reciprocal thereon, the sickle 92 being connected as by the pivot pin or bolt 93 to the swinging or output arm 94 of the transmission within the housing 63 as shown in U.S. Pat. 2,824,416. The mower has said inner shoe 76 which supports the mower off the ground. The weight of inner end of the mower and the load under which it engages the ground is counter-balanced by the inner shoe counterbalance means 98 which is in the form of a spring having a lower end connected as by a clevis and chain linkage 99 to an upstanding ear 100 on the end portion 89 of the coupling arm, the counterbalancing spring 98 extending diagonally upwardly and at its upper end having an adjustable threaded bolt connection 101 to an ear 102 which is formed on the upper portion of the mounting plate or portion 44 of the mower frame.

It will be observed that with the inner shoe 76 upon the ground and the spring 98 attached between the ear 100 and the lug 102, the spring tends to jackknife the mounting portion 44 toward the coupling arm about the axis of pivot as defined by the pivot pins or mounting pins 53, 57 which mount the upper inner end portion of the coupling arm 56. Thus, with the arm 56 acting through the inner shoe 76 against the ground, a lateral adjustment of the mounting plate 44 or the rear attachment or connection of means 44 may be effected by means of the combination lateral adjustment means and dual range lift linkage generally designated 105.

The linkage 105 comprises a rod 106 which is underposed with respect to the arm 56. The rod 106 has an outer eye end 107 which provides a pivot opening 108 for reception of the pin 109 which is keyed to a depending lug structure 110 on the underside of the arm 56 adjacent to its end 89. The link or rod 106 extends inwardly with reference to the adjacent side of the tractor and passes through an enlarged or loose opening 112 in a bracket structure 113 which depends from the lower portion 41 and is integrally connected thereto. The inner end portion 114 of the rod 106 is threaded and receives a pair of combination abutment and locking nuts 115 which are threaded on the end 114. The nuts 115 are adapted to abut the inner edge 116 of a cam member 117, said cam 117 comprising a U-shaped portion 118 with its opened end 119 receiving the rod over which the U-shaped portion is adapted to swing between the bracket 113 and the nut or adjusting means 115. In the position as shown in FIG. 13 it will be seen that the nuts 115 may be threaded onto or advanced with respect to the rod 106 so as to in effect shorten the rod 106 whereby the plate structure 44 is caused to pivot about a substantially horizontal fore-and-aft axis developed by the pin 53, 57' to close the gap G (FIG. 13) to mate port 44 with port 45. This swinging movement of the plate 44 is in opposition to the inner shoe spring means or biasing means 98. Thus, it will be seen that by advancing the nuts 115 or retracting them with respect to the threaded end 114, the lateral disposition of the plate 44 with respect to the mounting pad 45 is adjusted to position the plate vertically against vertical surface 45. Thus the structure 105 may serve during mounting of the mower to effect the vertical alignment for mounting of the plate 44 to the associated mounting structure 45 on the tractors. After the structure is mounted on the tractor the function of the mechanism 105 is to govern the lift of the mower as hereinafter described.

Figure 4:
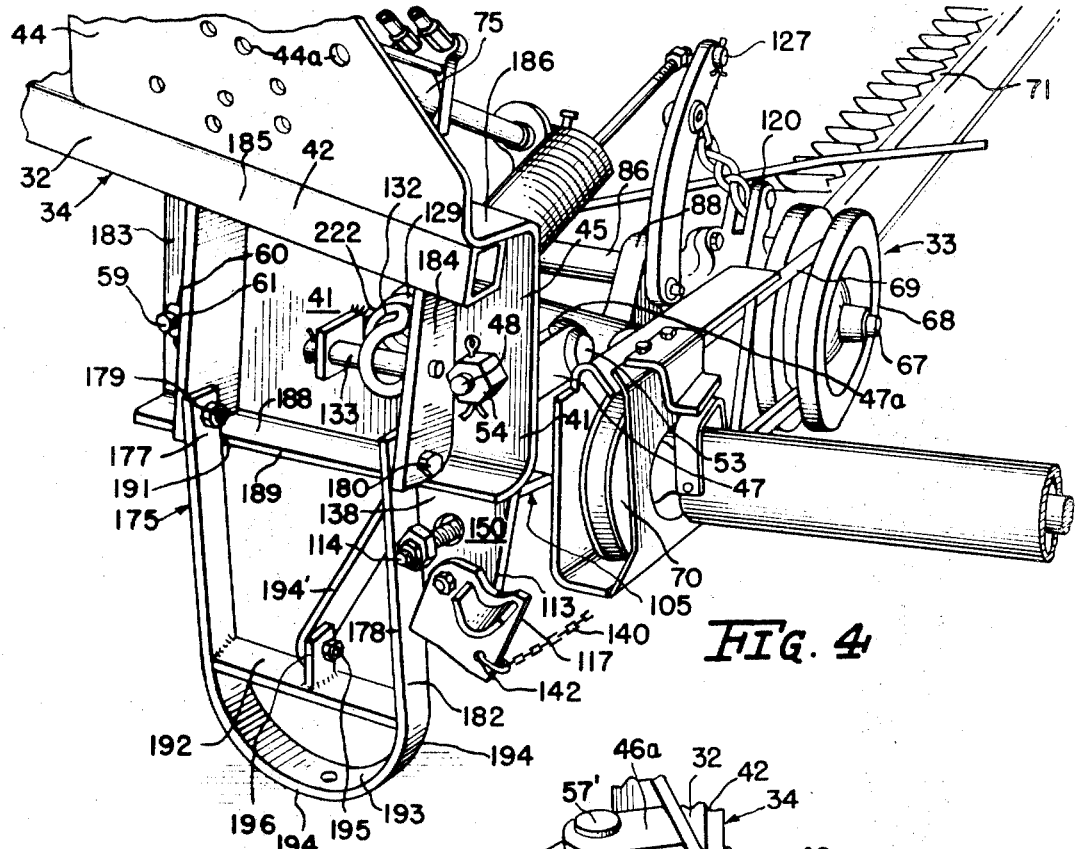
FIG. 4 is a perspective view of the dismounted mower taken from the rear side and inner end thereof.
Figure 5:
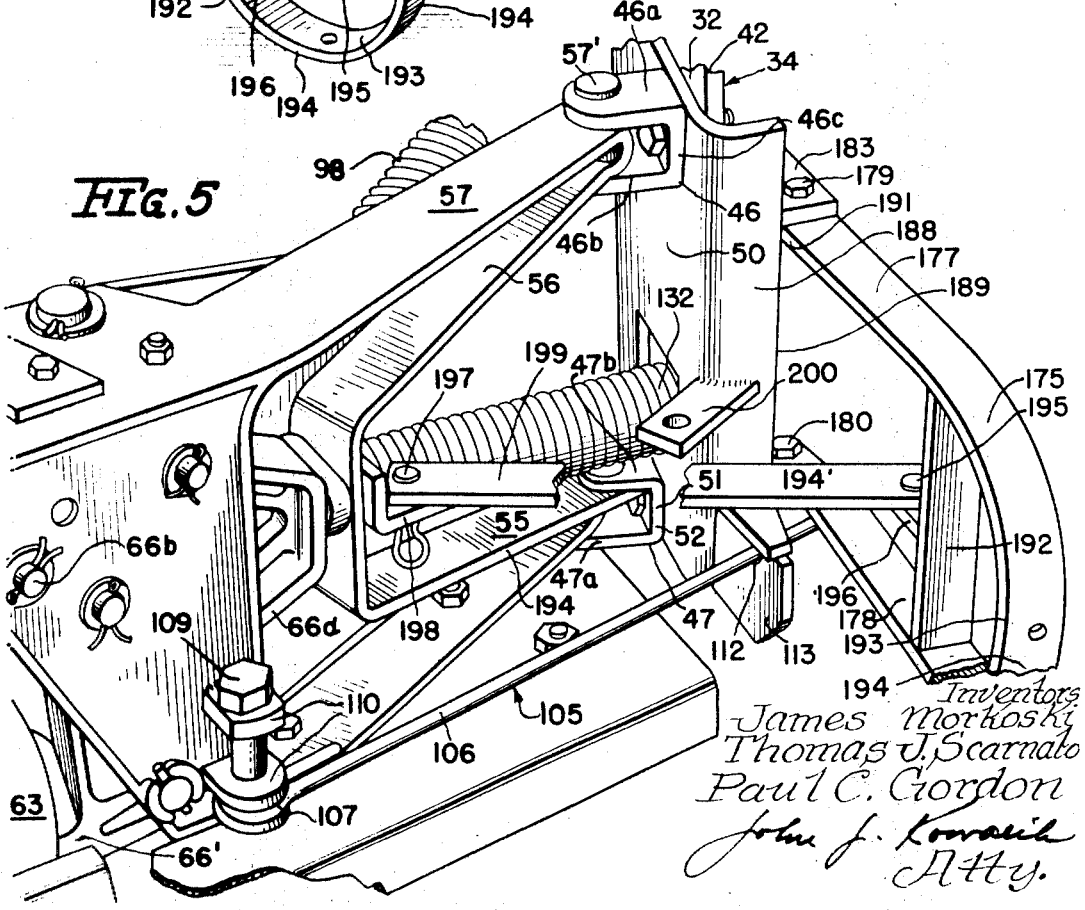
FIG. 5 is a perspective bottom view of a portion of the invention mower.

Referring now to FIGS. 4, 6 and 14, it will be seen that the mower housing 63 is provided with an upstanding anchor 120 which serves as a lever and has a connection by means of a pin 121 to linkage 122 in the form of a chain, the linkage 122 having a swivel connection 123 through a pin 124 to a lever arm 125 which is connected at its upper end by a pivot member 127 (FIG. 6) to the outer end of an outer shoe or mower balance spring means 129 through an adjustable bolt connection 130 on the outer end of spring 129, the spring 129 extending toward the mower frame portion 41 and having its inner end 132 (FIG. 4) connected to an anchor 133 suitably formed or provided for in the means of a pin and bracket assembly on said lower portion 41.

Referring now to the control mechanism 105 it will be noted that with the cam member 117 in its engaged position with the rod 106 and more specifically with the nuts 115, the effective length of the rod 106 is shortened. Under these circumstances upward movement of the coupling arm 56 about the pivots 53, 57' within the stroke length of the cylinder or ram 75 is limited. After a predetermined lifting of the coupling arm 56 and thus the inner end of the mower as accomplished by contraction of the ram, which causes the link 82 to pull through the pin 135 connecting link 82 with the upper end of arm 85, upwardly and also to swing the link 85 in a counterclockwise direction as seen in FIGS. 6, 13 and 14. The rockshaft 86 is swung in a counterclockwise direction and thus the lever 125 also swings in a counterclockwise direction and through the chain linkage 122 and the connection thereof at 121 with the lever arm 120 causes the mower to swing about the axis of the members 66, 62 into what is normally termed a transport position as seen in FIG. 13 in solid lines and in FIG. 8.

Optionally, when a gag lift is required, as seen in phantom lines in FIG. 13, (and this is the type of lift which is normally used in the normal operation of the mower in order to clear obstructions and so forth), the cam is disengaged from the rod 106 and thus a longer effective length over the cam-engaged position is obtained. In the disengaged position the cam 116 is caused to swing downwardly, it being overbalanced by the weighted portion 136, said cam swinging about the bolt 137 about a substantially horizontal axis. The bolt 137 is suitably connected to a vertical wall 138 of the bracket 113 below the aforesaid opening 112 which extends through the wall 138. As the cam member 117 is disengaged from the rod by releasing the flexible member 140 which is a chain or a rope connected as at 142 to the cam, said member 140 being suitably positioned on the side of the tractor as by connection to a loop or a hook 143 on the fender 144. It is to be understood that the member 140 may be anchored at its upper end anywhere to the tractor within reach of the operator at the platform station 146. Under the present described circumstances, that is with the cam disengaged, the stop members 115 which are the nuts will engage the inner side 150 of the plate 138 of the bracket as the arm 56 and mower are lifted. An increased upward swing or arc of movement of the coupling arm 56 is permitted before the upward swinging of the arm is stopped because of engagement of the stops 115 with the backside 150 of the bracket. Thereupon the same upward swinging movement of the mower is effected through the further swinging movement of the lever 125, the linkage 122 moving leftwardly as seen in FIGS. 13 and 14 and the the mower swinging about its axis of pivot at 65, 66. Inasmuch as most of the stroke of the piston has been expended in lifting the inner end portion of the mower together with the coupling structure, the remaining incremental portion of the piston stroke will just tilt the mower to about a 45 degree angle as shown in FIG. 13 in phantom, which is the gag position.

Thus it will be seen that the dual range lift mechanism not only functions for the purpose of controlling the position of the mower in its operating position but also is effective to align the rear mounting portion 44 of the frame with respect to the mounting pad 45 on the tractor.

Referring now to FIGS. 1 and 4 through 6, it will be observed that the mower is shown in parked position, that is ground-supported. There is shown a U-shaped parking stand 175 which includes a pair of legs 177 and 178 pivoted about a substantially horizontal axis by means of bolts 179, 180 and nut connections which extend through the upper ends of respective upright legs and through upright flange brackets 183 and 184 which are integrally connected with the backside of the lower portion 41 of the frame and to the inner end or rear end 42 of the mounting member 32 which is tucked under an outwardly extending flange 186 forming the lower edge of the mounting portion 44 into which the rear end portion 185 is connected as by welding. The members 183 and 184 are also connected at their lower edges to the top side of a rearwardly projecting flange 188 which forms the lower edge of the portion 41, said flange 188 having a rear edge 189 which is forwardly of the pivots of the bolts 179, 180 and provides a forward stop for the forward edge 191 of the structure 175 whereby the parking stand is prevented from folding under the coupling arm structure. The legs 177, 178 are reinforced adjacent to their lower ends by means of a cross brace 192 which is weld-connected thereto above the convex bottom portion 193, which bottom portion provides an arcuate ground engaging bottom surface 194 which engages the ground. It will be realized that the surface 194 is oriented about an axis lengthwise with respect to the longitudinal extent of the mower and permits the mower to be rocked about a substantially horizontal axis transverse to the longitudinal axis of the member 32, whereby adjustment of the combination pitch and adjusting bolt 59 within the slot 60 (FIG. 6) will effect the disposition of the member 32 with respect to the ground so that it has an upward and forward inclination for positioning the connecting end portion 31' thereof at an elevation for easy connection with the mounting plate 18. The parking stand is prevented from swinging inwardly by means of a stabilizing brace 194' which in the parking position of the stand is connected at its inner end as at 195 to an upstanding lug 196 on the cross brace 192, the opposite end of the strut 194' being connected as by a quick releasable pin 197 to a lug 198 which is formed at the juncture between the front and rear legs 55, 57 of the coupling arm 56. After the mower is mounted, the brace strut 194' is released or disconnected by removing the pin 197 from the bracket 198 and is swung upwardly and rearwardly with the parking stand 175 to the position shown in dotted lines in FIG. 6 whereupon the end portion 199 of the brace 194' is connected by the pin 197 to the depending lug or anchor 200 which depends from the underside of the flange 188. The lug 200 may be termed as depending from the underside of the portion 41. In this position the stand is held upwardly and tucked under the underside of the tractor.

OPERATION OF THE DEVICE

Assuming that the mower is in the position shown in FIG. 6 with the parking stand 175 and the inner shoe structure 76 of the mower as well as the mower 33 being upon the ground and the member 32 extending diagonally upwardly and forwardly and the lifting mechanism which includes the plate 18 being mounted in the appropriate location on the side of the tractor at its front end, the tractor is driven around the inner end of the mower and the side of the tractor is brought to a position substantially as shown in FIG. 1 in solid lines and in FIG. 2 in dotted lines. Thereupon the forward end portion 31' of the mounting arm 32 of the mower overrides the top of the plate 18. The bolt 23 is passed through the openings 21, 26 as seen in FIG. 3 and the nut 27 is tightened only sufficiently to insure that there would be no separation of the parts. The tractor is then driven forwardly. The arm 32 will automatically slide up the ramp 39 and onto the plate 18 from the position shown in phantom lines in FIG. 2 to the position shown in solid lines in FIG. 2. Thereupon the bolt 23 is threaded by the operator as seen in FIG. 9. If it is determined that the bolt 44a, FIGS. 1 and 9, on portion 44 do not line up with the bolt holes 45' on the mounting pad 45 because the rear end portion 44 is too low, then the bolt 23 is tightened whereupon the frame is caused to rock about an axis transverse to the tractor about the fulcrum 36 against the top surface 38 whereby the rear end of the frame is elevated. If it is determined that the bolt holes 44a are too high then the nut 27 is unthreaded and the rear portion is caused to lower until the bolt holes 44a are aligned horizontally with holes 45'. If, at this time, the face 44b (FIG. 14) of portion 44 is not in vertical parallelism with the face 45b on the mounting or connecting attachment means 45 which in this instance is the clutch housing of the tractor, then with the spring 98 in the position shown in FIG. 2 and the adjusting rod shown in the position of FIG. 14 the nuts 115 are either unthreaded with respect to the threaded end 114 or threaded on to it to advance on the rod whereby the frame is caused to tilt laterally as heretofore explained. The bolts 45c are then inserted into the bolt holes 44a, 45' and tightened. Thereafter, the securing bolt 208 is applied through the opening 209, 210 in order to secure the front end portion 31' of the mounting arm of the frame to the plate 18. No further adjustment of the bolt 23 is made. It will be realized that once the mower frame is mounted on the tractor the stand is placed in the position shown in phantom lines in FIG. 6 by disconnecting the pin 197 from the bracket 198 and connecting it to the bracket 200. The cylinder or ram 75 is suitably connected to the lugs 78, 81 and the hydraulic lines 220 are suitably connected to the power source mounted on the tractor as well known to those well skilled in the art. If the spring means 98 has not been heretofore connected, then the ram 75 is retracted in order to shorten up the distance between the brackets 102 and 100 and the spring assembly 98 is suitably secured between these brackets. At the same time the outer shoe spring assembly 129 is suitably connected with its pivot eye member 127 to the lever 125 and at its other end is connected to the pin 133 (FIG. 4), the inner end of the spring extending through an opening 222 in the portion 41. After the mower is hooked up, that is, the springs 129 and 98 are secured in position, then the power train 70 is connected and it will be realized that this involves a pair of telescoping shafts which extend toward the rear of the tractor and at the rear of the tractor are connected through a suitable gearing to the power take off of the tractor as shown in the before-mentioned patent. The mower is now operational. If it is desired to adjust the pitch of the mower proper, then the bolt 59 is loosened and is moved within the slot 60 to the proper position and the bolt 59 is then tightened and secured.

It will be realized that the bolt 48 as well as the ear 47 afford as the pivotal attachment of the mower coupling arm 56 to the frame on an axis transverse to the plane of the frame and therefore the position of the bolt 59 within the slot 60 will determine the elevation of the forward end 31' of the mounting arm of the frame so that the front end may be positioned at an elevation such that the coupling plate 18 on the different size tractors will readily slide under the coupling arm by driving the tractor so as to effect ready connection.

Figure 8:
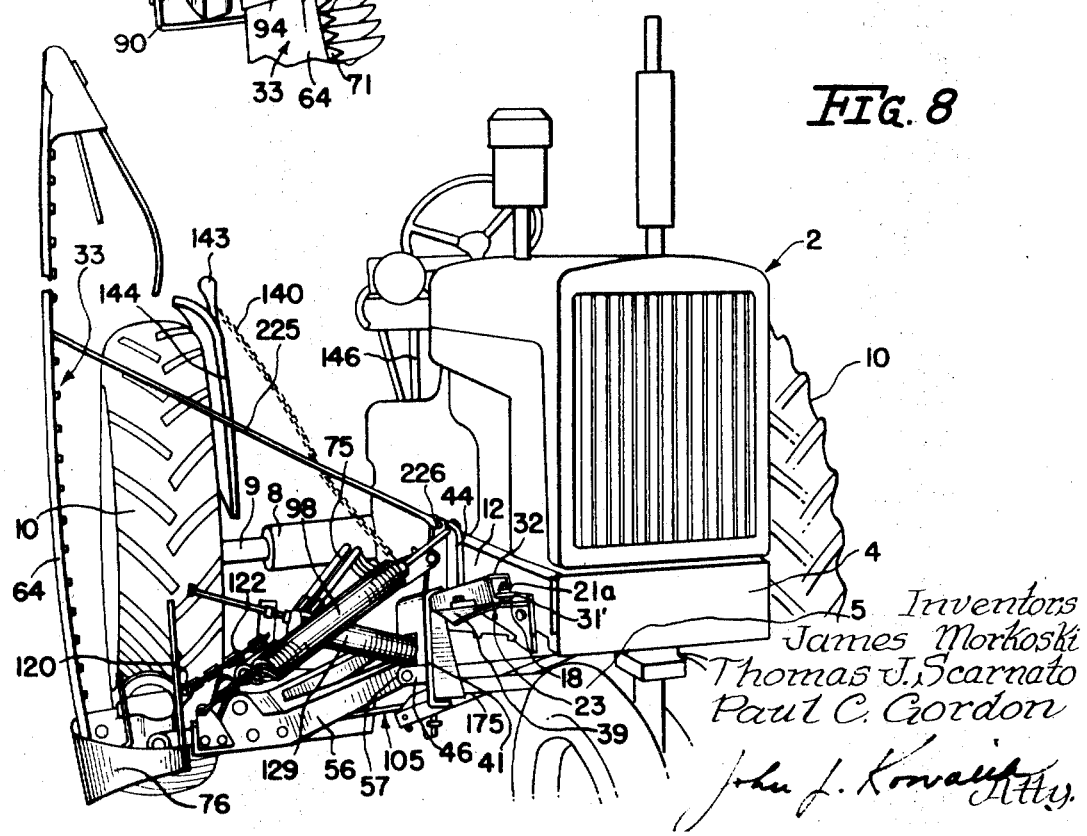
FIG. 8 is a front view of a tractor and mower mounted thereon.

As best seen in FIG. 8, the mower may be supported in transport position by a stay rod 225 connected between the bar 64 and a lug 226 on the portion 44 constituting the inboard end of the mower frame.

The dismounting of the mower proceeds in the reverse direction. The power train 70 is disconnected as shown in FIG. 1. The bolts 45c are removed and bolt 208 removed. Lines 220 are disconnected and the parking stand dropped and secured as in FIGS. 4 and 5. The tractor is then backed off, whereupon the mower swings away from the tractor and drops to the ground. With the stand resting upon the ground, the front bolt 23 is removed, whereupon the tractor is driven away from the mower.

We claim:

1. In an implement having a frame and an implement part carried thereby for vertical movement from a lowered operating position in which it tends to remain because of its own weight and a raised position to which it must be forcibly moved, the improvement comprising: an adjustable control linkage connected between said implement part and said frame for limiting movement of said implement part to said raised position and including a lost motion connection between the implement part and the frame accommodating unrestricted downward movement of the implement part, and an operator connected between said implement part and the frame for lifting the implement to a raised position to the extent of said lost motion, and means for changing the effective length of said linkage for selectively changing conjunctive motions of said frame and implement part and the movements of the implement part relative to the frame.

2. The invention according to claim 1 and said implement part being pivotally mounted to said frame on a substantially horizontal axis, and said implement part elongated transversely to said axis and extending laterally therefrom.

3. In an implement having a frame and an implement part carried thereby for vertical movement from a lowered operating position in which it tends to remain because of its own weight and a raised position to which it must be forcibly moved, the improvement comprising: an adjustable control linkage connected between said implement part and said frame for limiting movement of said implement part to said raised position and including a lost motion connection between the implement part and the frame accommodating unrestricted downward movement of the implement part, and an operator connected between said implement part and the frame for lifting the implement to a raised position to the extent of said lost motion, said implement part being pivotally mounted to said frame on a substantially horizontal axis, and said implement part elongated transversely to said axis and extending laterally therefrom, and said adjustable linkage underposed with respect to said implement part and connected to said implement part in an area spaced laterally from said axis and connected to the frame in an area below said axis.

4. The invention according to claim 3 and the connection of said linkage to the implement part being pivotal on an axis substantially parallel to the axis of pivot of the implement part.

5. In an implement having a frame and an implement part carried thereby for vertical movement from a lowered operating position in which it tends to remain because of its own weight and a raised position to which it must be forcibly moved, the improvement comprising: an adjustable control linkage connected between said implement part and said frame for limiting movement of said implement part to said raised position and including a lost motion connection between the implement part and the frame accommodating unrestricted downward movement of the implement part, and an operator connected between said implement part and the frame for lifting the implement to a raised position to the extent of said lost motion, and latch means mounted on the frame and interposable between said linkage and frame for foreshortening the linkage and thereby the extent of upward movement of the implement.

6. In an implement having a frame and an implement part carried thereby for vertical movement from a lowered operating position in which it tends to remain because of its own weight and a raised position to which it must be forcibly moved, the improvement comprising: an adjustable control linkage connected between said implement part and said frame for limiting movement of said implement part to said raised position and including a lost motion connection between the implement part and the frame accommodating unrestricted downward movement of the implement part, and an operator connected between said implement part and the frame for lifting the implement to a raised position to the extent of said lost motion, and said linkage comprising a rod pivoted at one end to the implement, and said frame having an opening admitting the other end of the rod therethrough to project the other end portion beyond the frame, and a nut threaded on the rod for varying the length thereof and abuttable with the frame on a side thereof remote from the implement.

7. In an implement having a frame and an implement part carried thereby for vertical movement from a lowered operating position in which it tends to remain because of its own weight and a raised position to which it must be forcibly moved, the improvement comprising: an adjustable control linkage connected between said implement part and said frame for limiting movement of said implement part to said raised position and including a lost motion connection between the implement part and the frame accommodating unrestricted downward movement of the implement part, and an operator connected between said implement part and the frame for lifting the implement to a raised position to the extent of said lost motion, and said implement comprising a mower pivoted to said part at an end remote from the frame, lever means connected to said mower, and said operator connected to the frame and having an operative connection to said implement part through said lever means.

8. The invention according to claim 7 and said implement part extending laterally and said operator disposed above the part and said control linkage disposed below said part.

9. The invention according to claim 8 and counterbalancing lifting spring means effective between the mower and the frame and between the implement part and the frame.

10. The invention according to claim 9 and said implement part pivoted to the frame and said linkage unrestrictively movable with the frame in the downward direction of movement of the frame and limiting upward movement of the frame.

11. The combination of a support structure, a mower mounted thereof and comprising a coupling arm pivotal relative to the support structure on a generally horizontal axis, a mower bar pivoted to the coupling arm on a generally horizontal axis for vertical swinging movement with and relative to the arm, operating linkage for lifting and lowering the arm and mower bar including a lever member pivoted to the arm on a generally horizontal axis at its end adjacent to the mower bar, means serving as a lever for the mower bar for swinging the mower bar about its axis of pivot to the arm, operator means connected between said lever member and the support structure for rotating said lever member and lifting the same, and linkage connected between the arm and the support structure and having a lost motion connection therewith, and operator controlled means for varying the amount of lost motion for varying the upward swinging movements of the coupling arm and thus varying the action of the operating linkage.

References Cited

UNITED STATES PATENTS

| 2,796,713 | 6/1957 | Richey | 56—25 |
| 2,827,746 | 3/1958 | Bouillant-Linet | 56—25 |
| 3,014,328 | 12/1961 | Scarnato et al. | 56—25 |
| 3,313,094 | 4/1967 | Wathen | 56—25 |

LOUIS G. MANCENE, Primary Examiner

J. A. OLIFF, Assistant Examiner